United States Patent
Li et al.

(10) Patent No.: US 6,879,550 B2
(45) Date of Patent: Apr. 12, 2005

(54) TRACKING METHOD IN AN OPTICAL STORAGE

(75) Inventors: Sung-Hung Li, Junghe (TW); Yi-Lin Lai, Keelung (TW)

(73) Assignee: Via Optical Solution, Inc., Taipei (TW)

( * ) Notice: Subject to any disclaimer, the term of this patent is extended or adjusted under 35 U.S.C. 154(b) by 471 days.

(21) Appl. No.: 10/180,104

(22) Filed: Jun. 27, 2002

(65) Prior Publication Data

US 2003/0043709 A1 Mar. 6, 2003

(30) Foreign Application Priority Data

Sep. 4, 2001 (TW) ......................................... 90121931 A

(51) Int. Cl.⁷ .............................................. G11B 7/00
(52) U.S. Cl. .................................................. 369/44.28
(58) Field of Search .......................... 369/44.24, 44.28, 369/44.41, 47.28, 47.29, 47.3, 124.12

(56) References Cited

U.S. PATENT DOCUMENTS

| | | | | |
|---|---|---|---|---|
| 5,351,222 A | * | 9/1994 | Ikeda et al. ............... | 369/30.17 |
| 5,909,419 A | * | 6/1999 | Kamiyama ................ | 369/53.23 |
| 6,597,224 B2 | * | 7/2003 | Lin et al. ..................... | 327/205 |
| 6,711,104 B2 | * | 3/2004 | Hirashima ................ | 369/44.28 |

FOREIGN PATENT DOCUMENTS

JP 08-045087 2/1996

* cited by examiner

*Primary Examiner*—Thang V. Tran
*Assistant Examiner*—Bach Vuong
(74) *Attorney, Agent, or Firm*—Rabin & Berdo, P.C.

(57) ABSTRACT

The disclosed invention provides a tracking method of an optical storage. When proceeding with tracking, the optical pickup head can be moved constantly and the TE signal can be detected. Then differentiation of the TE signal is obtained. If the differentiation is less than 0, then the TE signal is masked; otherwise, the TE signal is not masked. Therefore, the TE Hysteresis signal can be determined by the TE signal and its differentiation. The TE Hysteresis signal of 0 represents that the laser beam is in the Pit, and then the tracking procedure is finished. Otherwise, the aforementioned steps are repeated until the end of the tracking procedure.

13 Claims, 3 Drawing Sheets

TRACKING METHOD IN AN OPTICAL STORAGE

BACKGROUND OF THE INVENTION

This application incorporates by reference Taiwanese application Serial No. 90121931, filed Sep. 4, 2001.

1. Field of the Invention

This invention relates to a tracking method, and more particularly to a tracking method in an optical storage.

2. Description of Related Art

An optical storage picks up data by spinning an optical disc, moving the pickup head within the radius of the optical disc, and scanning the record level of an optical storage through a laser beam. The process comprises the following steps:

1. A spindle motor spins an optical disc;

2. The pickup head is moved within the disc and positioned so that the optical disc is spinning above the pickup head;

3. The Fine Tuning Focus Servo enables the laser beam to hit on the optical disc for focusing;

4. The Fine Tuning Tracking Servo adjusts the reflection mirror to enable laser beam to follow single data track to finish the tracking procedure;

5. The information on the disc is picked up.

During this process, the spinning and the external vibration can affect the accuracy of the device in picking up the data on the optical disc. As result, the tracking mechanism is constantly moving up, down, leftward, and rightward in order to maintain an accurate pickup. The purpose of the optical disc focusing and tracking is to enable the laser beam to focus on the pit of the spinning disc exactly in order to compensate for the vibrations resulting from bias, tilting, and so on. Now, the most commonly accepted tracking technology is the three-beam tracking method. This method uses the phase characteristics, via the reflection mirror to focus three beams from the 0-level and ±1 levels on the optical disc, in order to detect the tracking error. The following is the explanation of this tracking technology with reference to the accompanying illustrations.

Please refer to FIG. 1, which is an illustration of a light sensory device on an optical pickup head. The light sensory device includes 6 diodes. The light sensory detection array, which consists of diodes 110, 120, 130, 140, is for generating the Focus Error (FE) signal. The volume of the FE signal is FE=(A+C)−(B+D). The other two diodes 150 and 160 are the source for generating the Tracking Error (TE) signal, which has a volume of TE=F−E. When tracking is left more, the diode 150 receives the reflection from the Pit, and the diode 160 receives the reflection not from the Pit. Therefore, the signal from the diode 160 is stronger and the TE signal is a positive value (TE=F−E>0). Otherwise, the TE signal is a negative value. If the laser beams of the ±1 levels are showing in the Pit (or not in the Pit) at the same time, the reflections from the diode 150 and the diode 160 are the same and TE signal is 0 as shown in FIG. 2.

Next please refer to FIG. 2, which illustrates the relationship of the TE signal, the RFRP signal, and the TE Hysteresis signal. As mentioned above, when the laser beams of the ±1 levels are showing in the Pit or not in the Pit at the same time, the TE signal becomes 0. As the figure shows, the point A represents the laser beams showing in the pit simultaneously, and the point B represents the laser beams showing not in the pit simultaneously. If the TE signal is 0, it is used to judge whether it is the right tracking or not, the point B must be masked to avoid erroneous judgment. Therefore, practically, the Radio Frequency Ripple (RFRP) signal is for masking the point B. In the conventional method, the RFRP signal is generated from the envelope of the Radio Frequency signal, which has a phase leading the TE signal by 90 degrees. Therefore, when the RFRP signal is negative, the TE signal would be masked to achieve the objective of masking the point B. By implementation, when the RFRP signal is turning from positive to negative, the TE signal is held, and when the RFRP signal is turning from negative to positive, the TE signal is released, which results in the TE Hysteresis signal. A TE Hysteresis signal of 0 indicates correct tracking.

By the traditional implementation, the presupposition of using the RFRP signal to mask the TE signal is the 90-degree phase difference between the two signals. But practically, the phase difference between the FRFP signal and the TE signal is not always 90 degrees, which would cause erroneous masking, and affect the reliability of tracking.

It is therefore an objective of the invention to provide a tracking method in an optical storage by the differentiation of the TE signal to determine when to mask the TE signal, to improve the reliability of tracking.

In accordance with the foregoing objective of the invention, the steps of the procedure are described as in the following.

When proceeding with tracking, the optical pickup head can be moved constantly, and the TE signal can be detected. Then the differentiation of the TE signal is obtained. If the differentiation is less than 0, the TE signal is masked, otherwise, the TE signal is not masked. Therefore, the TE Hysteresis signal can be determined by the TE signal and its differentiation. A TE Hysteresis signal of 0 represents that the laser beam is in the Pit, and then the tracking procedure is finished. Otherwise, the aforementioned steps are repeated until the end of the tracking procedure.

Objects, features, and advantages of the invention can be more fully understood by reading the following detailed description of the preferred embodiment, with reference made to the accompanying drawings, wherein.

Figure 1:
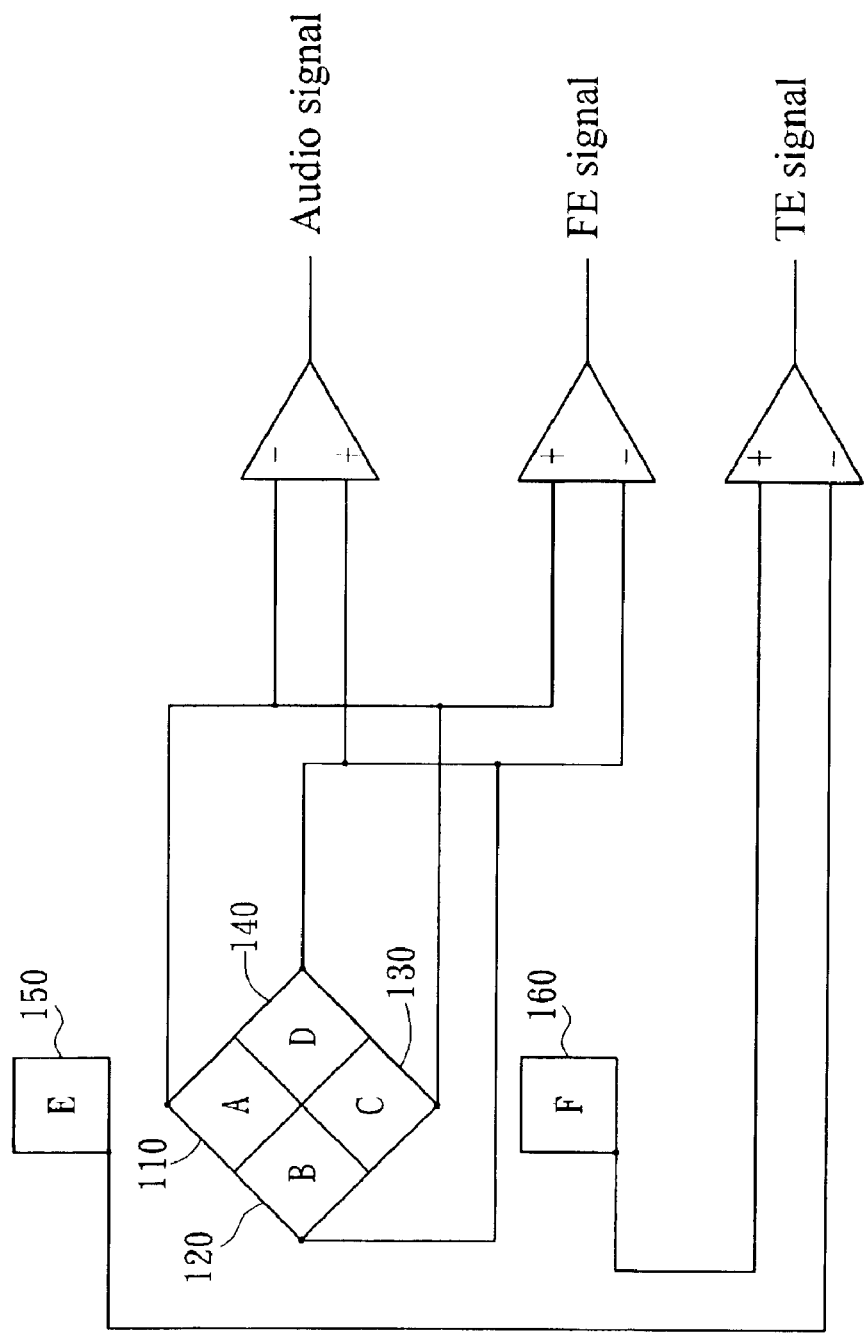
FIG. 1 is an illustration of the light sensory device of an optical pickup head.
Figure 2:
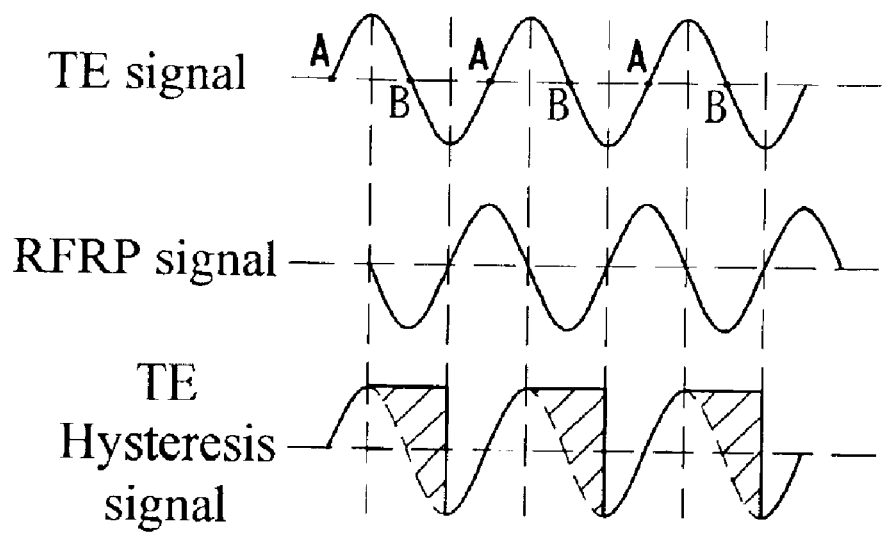
FIG. 2 illustrates the relationship of the TE signal, the RFRP signal, and the TE Hysteresis signal.
Figure 3:
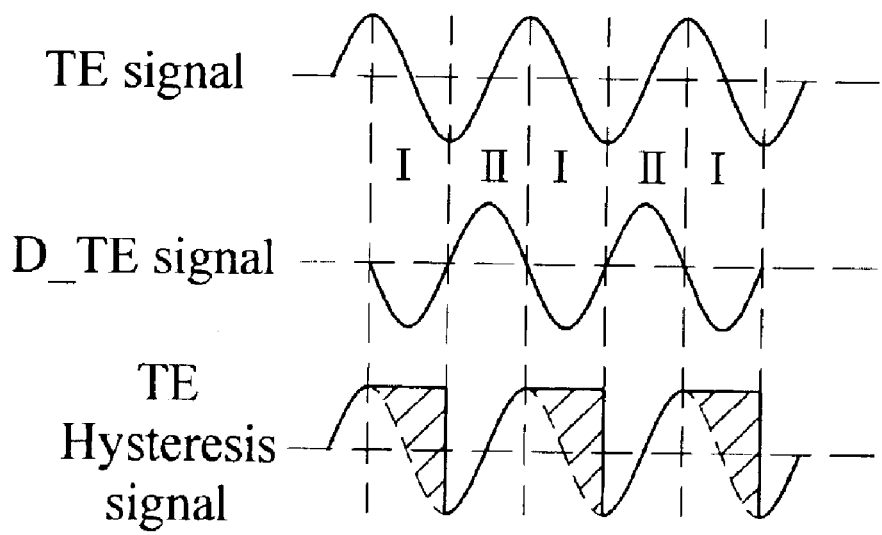
FIG. 3 illustrates the relationship between the TE signal and the TE Hysteresis signal of the prefered embodiment of this invention.

Please refer to FIG. 3, which illustrates the relationship of the TE signal, the D_TE signal, and the TE Hysteresis signal, according to the preferred embodiment of this invention, wherein, the D_TE signal is differentiated from the TE signal. The present invention differs from the conventional method of masking the Tracking Error (TE) signal by the Radio Frequency Ripple (RFRP) signal, because this invention uses the differentiation of the TE signal to determine the timing of masking the TE signal. As FIG. 3 shows, the TE signal is a sinusoidal waveform. Therefore, if the TE signal is differentiated continuously, the differentiation will alternate between positive and negative values. It means when the TE signal is in the Zone I, the differentiation is negative. When the TE signal is in the Zone II, the differentiation is positive. And the differentiation of the maximum or minimum of the TE signal is 0. Therefore, if the TE signal in the Zone I is masked, the TE Hysteresis signal is generated to meet the design requirement.

Figure 4:
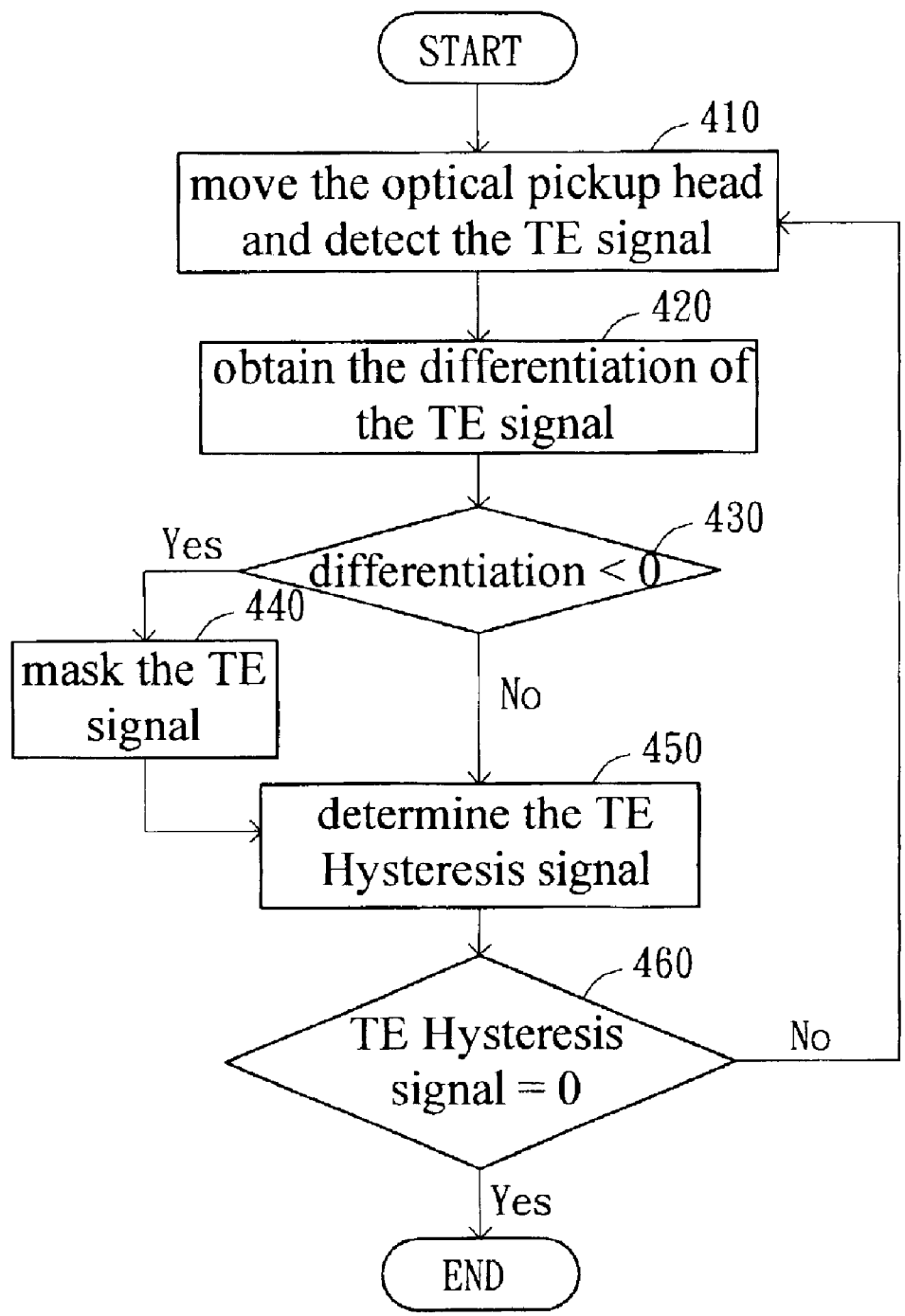
FIG. 4 illustrates the flow chart of the tracking method of an optical storage according to the preferred embodiment of this invention.

Next, please refer to FIG. 4, which illustrates the flow chart of the tracking method of an optical storage according to the preferred embodiment of this invention. When proceeding with tracking, the optical pickup head can be moved constantly, and the TE signal can be detected in Step 410. Then the differentiation of the TE signal is obtained in the Step 420. If the differentiation is less than 0, it means that the TE signal is in Zone I, and then the TE signal is masked (Step 440). If the differentiation is greater than 0, then it means that the TE signal is in Zone II, and the TE signal does not need to be masked. Therefore, the TE Hysteresis signal can be determined by the TE signal and the differentiation (Step 450), and the end of tracking is checked by the signal. If the TE Hysteresis signal is 0, then the laser beam is judged to be in the Pit, and the tracking procedure is finished. Otherwise, the above-mentioned steps are repeated until the end of tracking procedure (Step 460).

The feature of the disclosed tracking method is the use of the differentiation of the TE signal to determine the timing of masking the TE signal, and furthermore, to determine the TE Hysteresis signal. This method can be applied to any kind of optical storage or optical disc writer, which uses the tracking method of the TE Hysteresis signal, such as the CD-ROM, DVD-ROM, CD-R, CD-RW, and so on. The value of implementation is very high.

Since the TE signal could be used for calculating the number of tracks while the optical pickup head moves accross the tracks of optical disc, the TE signal could be viewed as a crossing track signal. According to the invention, other kinds of crossing track signals could also be used in the invention.

The above embodiment disclosure that the invention, a tracking method of an optical storage using the differentiation of the TE signal to determine the timing of masking the TE signal can increase the reliability of tracking.

The invention has been described using the exemplary preferred embodiment. However, it is to be understood that the scope of the invention is not limited to the disclosed embodiment. On the contrary, it is intended to cover various modifications and similar arrangements. The scope of the claims, therefore, should be accorded the broadest interpretation so as to encompass all such modifications and similar arrangements.

What is claimed is:

1. A tracking method of an optical storage, the optical storage having an optical pickup head which is used for checking a Tracking Error (TE) signal, the tracking method comprising:

moving the optical pickup head and detecting the TE signal;

obtaining a differentiation signal according to the TE signal;

checking the differentiation signal, if the differentiation signal is less than 0, then masking the TE signal;

determining a TE Hysteresis signal according to the differentiation signal and the TE signal; and checking the TE Hysteresis signal, if the TE Hysteresis signal is 0, then finishing the tracking procedure.

2. The tracking method of an optical storage according to claim 1, wherein the optical storage is a CD-ROM.

3. The tracking method of an optical storage according to claim 1, wherein the optical storage is a DVD-ROM.

4. The tracking method of an optical storage according to claim 1, wherein the optical storage is an optical disc writer.

5. The tracking method of an optical storage according to claim 4, wherein the optical disc writer is a CD-R.

6. The tracking method of an optical storage according to claim 4, wherein the optical disc writer is a CD-RW.

7. A tracking method of an optical storage, which optical storage includes an optical pickup head, which is for checking a corssing track signal, the tracking method comprising:

detecting the corssing track signal by utilizing the optical pickup head;

obtaining a differentiation signal according to the corssing track signal;

masking the corssing track signal when the differentiation signal is less than 0;

determining a crossing track hysteresis signal according to the crossing tack signal and the differentiation signal; and checking the crossing track hysteresis signal to determine whether to finish the tracking procedure.

8. The tracking method of an optical storage according to claim 7, wherein the crossing track signal is a Tracking Error (TE) signal.

9. The tracking method of an optical storage according to claim 7, wherein the optical storage is a CD-ROM.

10. The tracking method of an optical storage according to claim 7, wherein the optical storage is a DVD-ROM.

11. The tracking method of an optical storage according to claim 7, wherein, the optical storage is an optical disc writer.

12. The tracking method of an optical storage according to claim 11, wherein the optical disc writer is a CD-R.

13. The tracking method of an optical storage according to claim 11, wherein the optical disc writer is a CD-RW.

* * * * *